United States Patent
Eguchi

(10) Patent No.: US 7,072,062 B2
(45) Date of Patent: Jul. 4, 2006

(54) SERVER DEVICE AND COMMUNICATION METHOD

(75) Inventor: Masashi Eguchi, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 880 days.

(21) Appl. No.: 09/908,103

(22) Filed: Jul. 17, 2001

(65) Prior Publication Data

US 2002/0054365 A1    May 9, 2002

(30) Foreign Application Priority Data

Jul. 25, 2000   (JP)   ............................. 2000-223727

(51) Int. Cl.
G06K 13/00     (2006.01)
H04N 1/00      (2006.01)

(52) U.S. Cl. ...................................... 358/1.15; 358/405

(58) Field of Classification Search ................ 358/405, 358/407, 434, 442, 1.15, 402; 709/206, 207, 709/203; 380/243, 255, 246
See application file for complete search history.

(56) References Cited

U.S. PATENT DOCUMENTS

| | | | | |
|---|---|---|---|---|
| 5,907,598 A * | 5/1999 | Mandalia et al. | ...... | 379/100.01 |
| 5,945,989 A * | 8/1999 | Freishtat et al. | ............ | 715/760 |
| 6,138,146 A * | 10/2000 | Moon et al. | ................ | 709/206 |
| 6,161,008 A * | 12/2000 | Lee et al. | ................... | 455/415 |
| 6,163,536 A * | 12/2000 | Dunn et al. | ................. | 370/352 |
| 6,182,076 B1 * | 1/2001 | Yu et al. | ........................ | 707/10 |
| 6,205,139 B1 * | 3/2001 | Voit | ........................ | 370/389 |
| 6,219,150 B1 * | 4/2001 | Eguchi | ...................... | 358/1.15 |
| 6,300,873 B1 * | 10/2001 | Kucharczyk et al. | .... | 340/568.1 |
| 6,320,857 B1 * | 11/2001 | Tonnby et al. | .............. | 370/352 |
| 6,367,017 B1 * | 4/2002 | Gray | ......................... | 713/200 |
| 6,381,320 B1 * | 4/2002 | Creamer et al. | ....... | 379/201.01 |
| 6,389,464 B1 * | 5/2002 | Krishnamurthy et al. | ... | 709/220 |
| 6,404,746 B1 * | 6/2002 | Cave et al. | ................. | 370/262 |
| 6,417,933 B1 * | 7/2002 | Szurkowski | ................ | 358/442 |
| 6,418,200 B1 * | 7/2002 | Ciccolella et al. | ....... | 379/88.18 |
| 6,463,145 B1 * | 10/2002 | O'Neal et al. | ......... | 379/211.02 |
| 6,477,240 B1 * | 11/2002 | Lim et al. | ................... | 379/67.1 |
| 6,549,612 B1 * | 4/2003 | Gifford et al. | ............ | 379/67.1 |
| 6,574,670 B1 * | 6/2003 | Eguchi | ....................... | 709/245 |
| 6,697,474 B1 * | 2/2004 | Hanson et al. | ......... | 379/201.01 |
| 6,731,410 B1 * | 5/2004 | Saito et al. | .................. | 358/468 |
| 6,745,022 B1 * | 6/2004 | Knox | ......................... | 455/406 |
| 6,747,970 B1 * | 6/2004 | Lamb et al. | ................ | 370/352 |
| 6,778,528 B1 * | 8/2004 | Blair et al. | ................. | 370/352 |
| 6,781,721 B1 * | 8/2004 | Toyoda et al. | .............. | 358/402 |

(Continued)

FOREIGN PATENT DOCUMENTS

JP     11-177672     7/1999

*Primary Examiner*—Madeleine A V Nguyen
(74) *Attorney, Agent, or Firm*—Hogan & Hartson LLP

(57) ABSTRACT

A server device (20) which receives, from a channel, electronic mail including information of a transfer destination, an authentication number to an authentication device and data, responds to the electronic mail, requests authentication to the authentication device, and transfers the data to the transfer destination when the authentication number is confirmed by the authentication device. The server device (20) rejects the transfer of the data when the authentication number is not received by the server device (20), and sends a reply to that effect to the transmission source of the data by using electronic mail. Moreover, when the authentication number is not received by the server device (20), the server device (20) requests authentication to the authentication device by using a predetermined authentication number.

15 Claims, 5 Drawing Sheets

U.S. PATENT DOCUMENTS

| | | |
|---|---|---|
| 6,819,667 B1 * | 11/2004 | Brusilovsky et al. ....... 370/354 |
| 6,823,357 B1 * | 11/2004 | Du et al. .................... 709/203 |
| 6,836,765 B1 * | 12/2004 | Sussman ...................... 705/75 |
| 6,891,940 B1 * | 5/2005 | Bhandari et al. ...... 379/142.06 |
| 6,909,708 B1 * | 6/2005 | Krishnaswamy et al. ... 370/352 |
| 6,982,803 B1 * | 1/2006 | Eguchi ...................... 358/1.15 |
| 2001/0000709 A1 * | 5/2001 | Takahashi et al. .......... 380/277 |
| 2001/0005268 A1 * | 6/2001 | Eguchi ........................ 358/1.9 |

* cited by examiner

FIG. 4

DATA FORMAT FOR IMAGE DATA TRANSFER USING ELECTRONIC MAIL

| HEADER | DESTINATION(TO) COPY TRANSMISSION DESTINATION(CC) SUBJECT |
|---|---|
| ENCRYPTED TEXT | TRANSFER DESTINATION FAX NO.–075–123–4567 PIN=1234 |
| ATTACHED FILE | IMAGE DATA |

US 7,072,062 B2

SERVER DEVICE AND COMMUNICATION METHOD

CROSS REFERENCES TO RELATED APPLICATONS

This application claims priority under 35 USC 119 of Japanese Patent Application No. 2000-223727 filed in JPO on Jul. 25, 2000, the entire disclosure of which is incorporated herein by reference.

BACKGROUND OF THE INVENTION

1. Field of the Invention

The present invention relates to a server device such as a facsimile server device used for a facsimile system, and a communication method.

2. Description of the Related Art

A facsimile system has been commercialized in which a facsimile server device which is connected to such a communication line as a PSTN (public switched telephone network) and has a facsimile transmission/reception function, and client equipment such as a personal computer are connected via a LAN (a local area network). In this facsimile system, a facsimile server device transmits image data to a transmission destination via the communication line by performing transmission of electronic mail having the image data and the transmission destination information from the client equipment to the facsimile server device, and when the facsimile server device receives image data, the client equipment receives the image data by sending the image data to predetermined client equipment.

In North American countries, when a call is placed from a telephone or facsimile machine, PIN (personal identification number) information which is a code number or an authentication number to identify whether the user is the valid one is sent to the switchboard of a PSTN for authentication. After the authentication is performed, communication with a intended destination party is made. If the PIN information is incorrect, it is possible to restrict use of a public telephone network, and prevent illegal use of the public telephone network.

However, the facsimile server device of this facsimile system cannot transfer image data by using PIN information. Therefore, illegal use of the public telephone network cannot be prevented.

SUMMARY OF THE INVENTION

It is an object of the present invention to solve the above problem, respond to electronic mail having such data as image data, provide a server device such as a facsimile server device which can transfer the data by using PIN information, and provide communication methods.

According to one aspect of the present invention, there is provided a server device having reception means for receiving electronic mail which includes at least a telephone number of a transfer destination, an authentication number for a public network, and such data as an attached file, and having transmission means for responding to the received electronic mail, requesting authentication to the public network by using the authentication number, and transferring the data to the telephone number of the transfer destination when the authentication number is confirmed.

According to another aspect of the present invention, there is provided a server device having reception means for receiving electronic mail which includes at least a facsimile number of a transfer destination, an authentication number for a public network, and image data, and having transmission means for responding to the received electronic mail, requesting authentication to the public network by using the authentication number, and transferring the data to the facsimile number of the transfer destination when the authentication number is confirmed by an authentication device.

In the server devices, it is preferable that the server devices should further include reply means for rejecting transmission of data or image data when an authentication number is not received, and sending electronic mail to that effect to the transmission source.

Moreover, in the server devices, it is further preferable that the transmission means should request authentication to the public network by using a predetermined authentication number when the authentication number is not received.

It is still preferable that at least the authentication number should be encrypted.

BRIEF DESCRIPTION OF THE DRAWINGS

FIG. 4 is a diagram showing a format for image data transfer by using electronic mail used for the embodiment.

DETAILED DESCRIPTION OF THE INVENTION

Following is a description of the preferred embodiment of the present invention with reference to the drawings.

(Embodiment)

Figure 1:
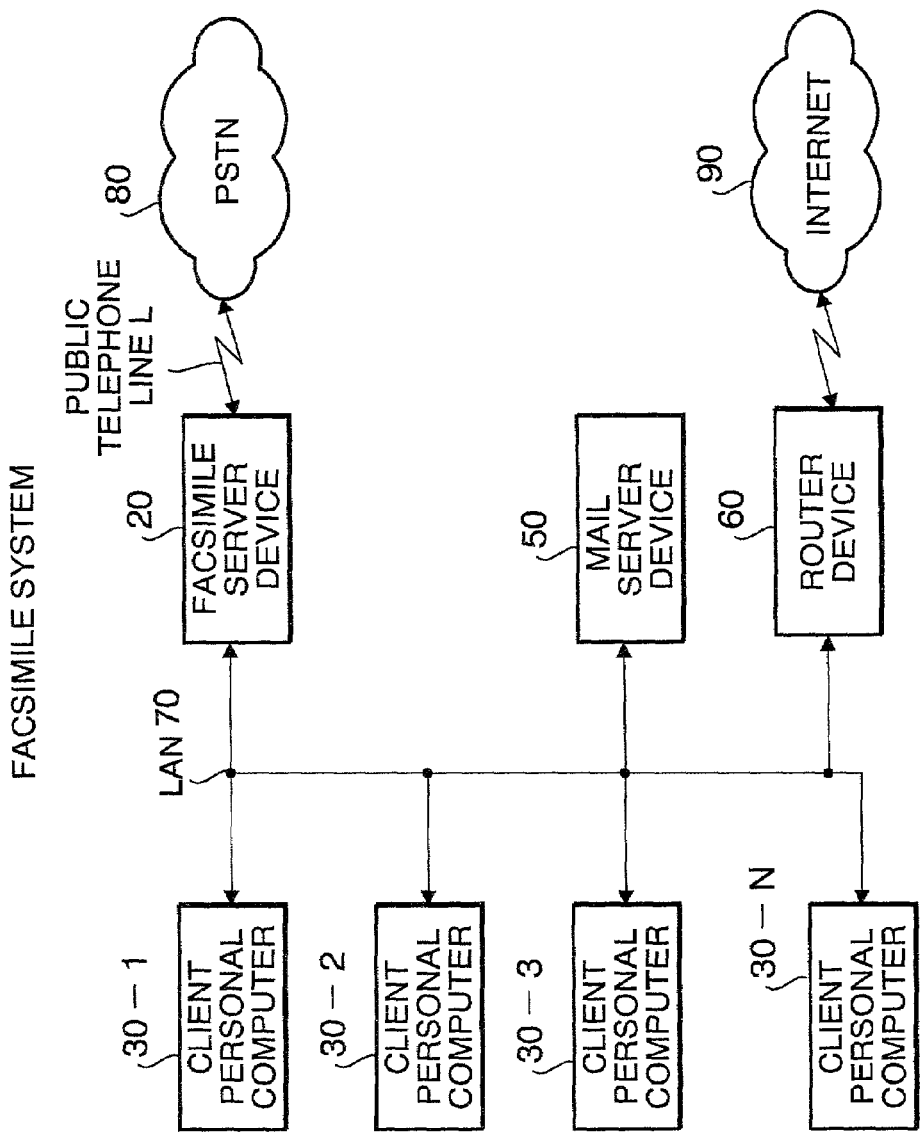
FIG. 1 is a block diagram showing a facsimile system, according to an embodiment of the present invention, which includes a facsimile server device 20 which has an authentication request function to a PSTN.

The facsimile system shown in FIG. 1 includes an N number of client personal computers 30-1 to 30-N, a facsimile server device 20 connected to a PSTN 80 via a public telephone line L, a mail server device 50 and a router device 60 connected to the Internet 90. These computers and devices are connected to one another via a LAN 70. Hereafter, a client personal computer is abbreviated to a client PC, and reference number 30 represents any one of reference numbers 30-1 to 30-N.

In this embodiment, the facsimile server device 20 receives, from the mail server device 50, electronic mail which includes at least a facsimile number of a transfer destination, PIN information which is an authentication number for the PSTN 80, and image data (YES in Step S1 in FIG. 5), responds to this electronic mail, requests authentication to the PSTN 80 by using the PIN information, and transmits the image data to the facsimile number of the transfer destination when the authentication number is confirmed (Steps S6 and S7). If the PIN information is not received (NO in Step S5) and the mode is not a default PIN information transfer mode (NO in Step S8), the facsimile server device 20 rejects transmission of the data or the image data, and replies to the transmission source by using electronic mail to that effect (Step S10). If the PIN information is not received (NO in Step S5) and the mode is the default PIN information transfer mode (YES in Step S8), the facsimile server device 20 requests authentication to the PSTN 80 by using predetermined PIN information stored in the default PIN information file in a RAM 7 in advance, and places a call (Step S9). At least the PIN information included in the electronic mail which is transmitted from the client personal computer 30 is encrypted, and the facsimile server device 20 decrypts the text (including the PIN information) of the received electronic mail by using a decrypting key stored in a decrypting key file 7a in the RAM 7 in advance (Step S2).

In FIG. 1, the mail server device 50 receives electronic mail from the client PC 30, or from a mail server device (not shown) of a sender via the Internet 90 and the LAN 70, and if the received mail includes image data encrypted with a MIME (Multipurpose Internet Mail Extension) format, the mail server device 50 holds the electronic mail which includes the image data. When electronic mail which includes image data is transmitted via the Internet 90, the electronic mail is transmitted from the client PC 30 to a mail server device at a destination via the mail server device 50, the router device 60 and the Internet 90.

Figure 2:
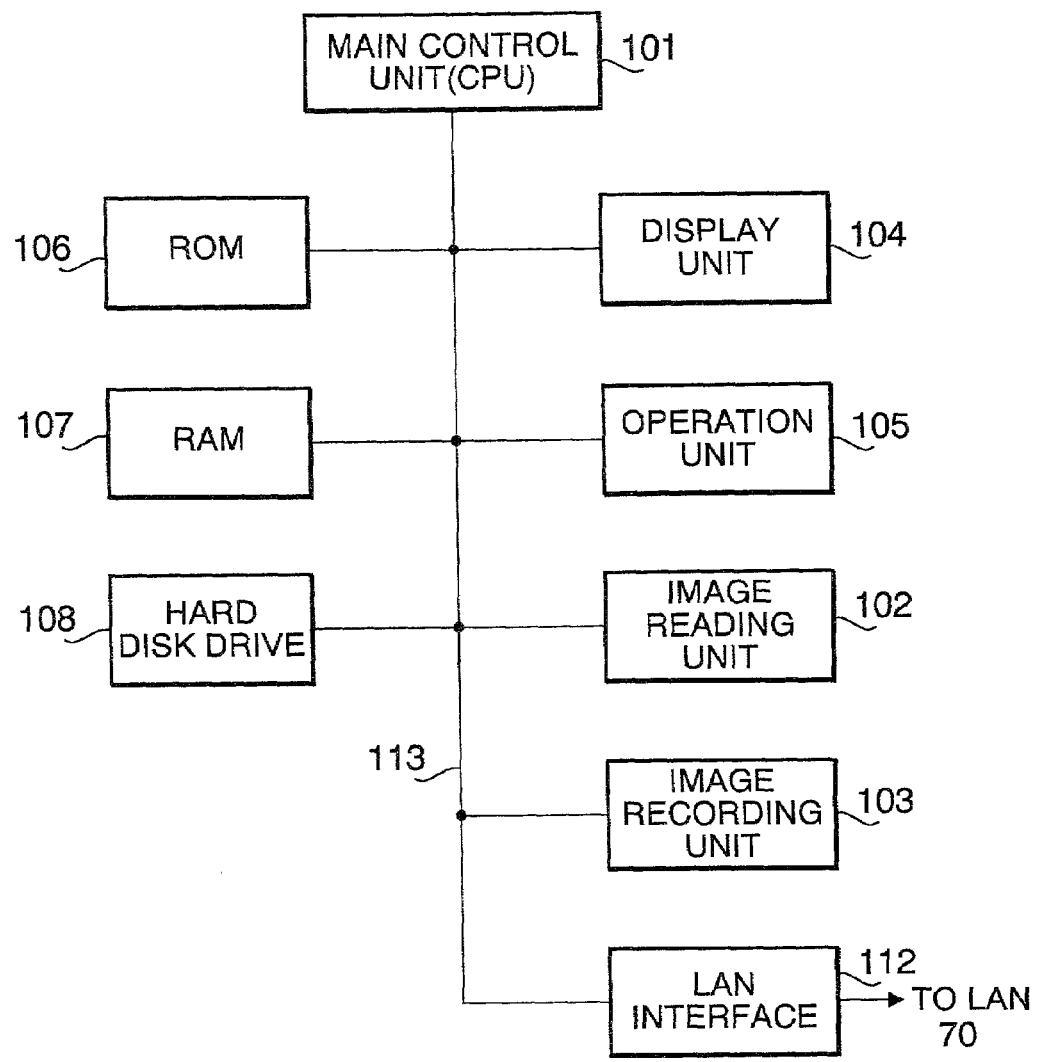
FIG. 2 is a block diagram showing a client personal computer 30 in FIG. 1 (reference number 30 represents any one of reference numbers 30-1 to 30-N)

In FIG. 2, the client PC 30 is a known personal computer and executes such processing as generating and recording of image data and text data. In this embodiment, the client PC 30 is used as a terminal device, for example, which transmits or receives facsimile image data. A main control unit 101 includes a CPU, is connected to each of the following hardware units via a bus 113, controls these hardware units, and executes various software functions which will be described later. In this client PC 30, an image reading unit 102 and an image recording unit 103 are provided as options. The image reading unit 102 reads an original by a scanner using CCD, for example, and outputs the converted monochrome binary data which is dot image data. The image recording unit 103 is an electro-photographic printer, for example, and prints out and records, as hard copy, image data received from another facsimile server device via facsimile communication, or records text data. A display unit 104 is such a display device as a liquid crystal display (LCD) or a CRT display, and displays the operation status of the client PC 30, image data of an original to be transmitted, and received image data. An operation unit 105 is a keyboard, for example, used for inputting text data and instruction commands.

A ROM 106 is required for operation of the client PC 30, and stores various software programs to be executed by the main control unit 101. A RAM 107 includes an SRAM, a DRAM, and an SDRAM, and is used as a working area of the main control unit 101, and stores temporary data which is generated when the program is executed. A hard disk drive 108 is a storage device which includes a recording medium, and stores application programs to be executed and an image memory. A LAN interface 112 is connected to the LAN 70, receives signals and data from the LAN 70, transmits signals and data to the LAN 70, and executes interface processing such as signal conversion and protocol conversion.

Figure 3:
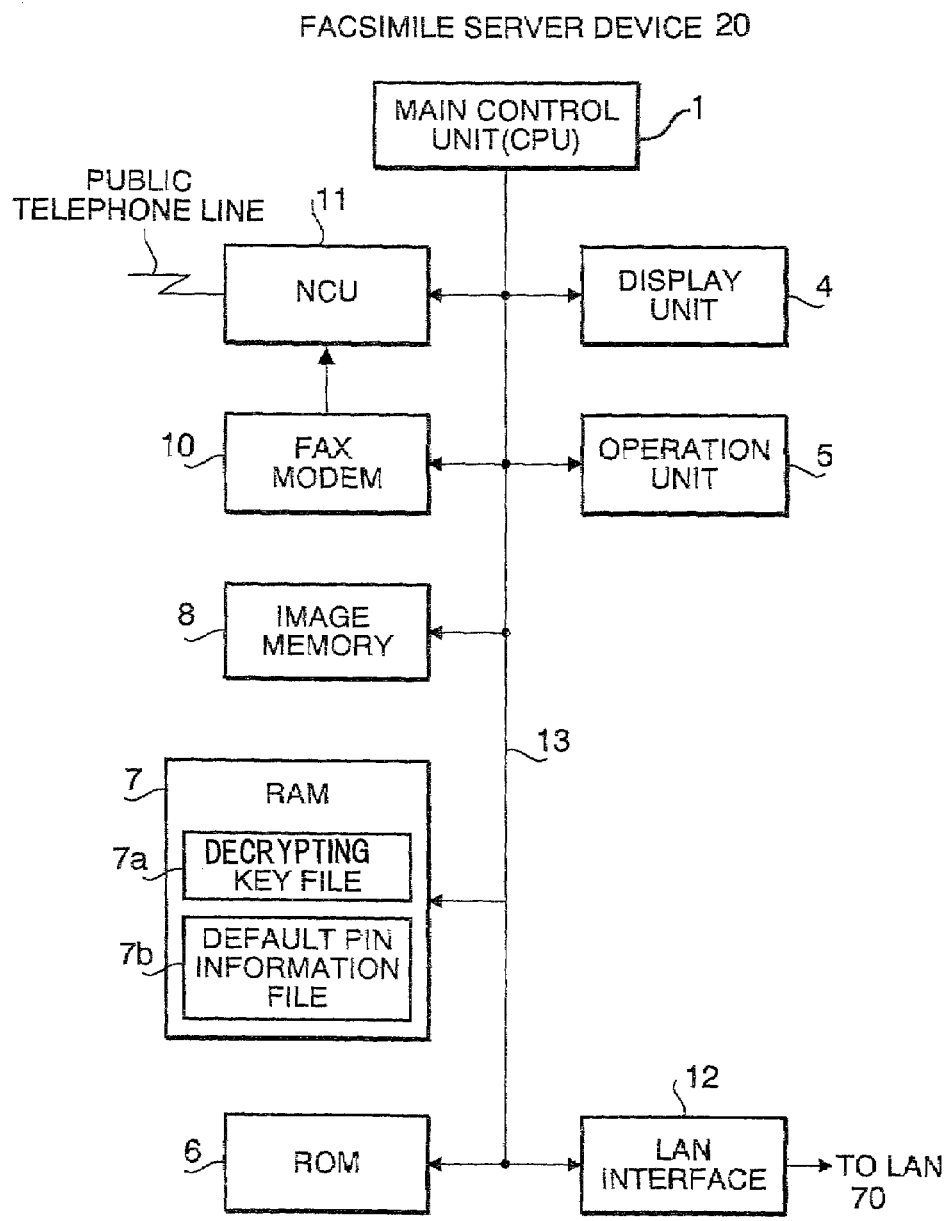
FIG. 3 is a block diagram showing the facsimile server device 20 in FIG. 1.

In FIG. 3, the facsimile server device 20 has facsimile communication functions such as a G3 method. The main control unit 1 includes a CPU, is connected to each of the following hardware units via the bus 13, controls these units, and executes various software functions to be described later. A display unit 4 is a display device such as a liquid crystal display (LCD) or a CRT display, and performs display of the operation status of the facsimile server device 20, image data of an original to be transmitted, and received image data. A control unit 5 includes character keys, ten keys for dialing, abbreviation dial keys, one-touch dial keys and various function keys. The display unit 4 may be a touch panel type, and a part or all of the keys of the control unit 5 may be replaced by the touch panel.

A ROM 6 stores the various software programs which are required for operation of the facsimile server device 20, and are executed by the main control unit 1. These programs include at least programs for the transmission processing in FIG. 5. The RAM 7 includes an SRAM, a DRAM, an SDRAM and so on, is used as the working area of the main control unit 1, and stores temporary data which is generated when a program is executed. The RAM 7 includes the decrypting key file 7a and a default PIN information file 7b which will be described later. If a flash memory is used as the RAM 7, the content of the data will not be lost even if power is shut off due to an electric power failure, movement of the device or the like. An image memory 8 has a DRAM and so on, and stores image data to be transmitted or received image data.

A fax modem 10 is connected to a public telephone line L and possesses functions of an ordinary fax modem for facsimile communication. An NCU (Network Control Unit) 11 is a hardware circuit closing and opening the DC loop of the analog public telephone line L and having an automatic dialing function, and connects the fax modem 10 to the public telephone line L according to necessity. The NCU 11 detects an ID reception terminal startup signal in a transmission telephone number notification service and a normal telephone call signal, and can transmit a primary response signal and a secondary response signal in the transmission telephone number notification service when such a signal is necessary. The NCU 11 may be connected to a digital line (e.g. an ISDN line) which is a baseband transmission method via a predetermined terminal adapter and a DSU (Digital Service Unit).

A LAN interface 12 is connected to the LAN 70, receives signals and data from the LAN 70. Meanwhile, the LAN interface 12 transmits signals and data to the LAN 70, and further executes interface processing such as signal conversion and protocol conversion.

The facsimile server device 20 constituted in this way has facsimile communication functions such as a normal G3 method. Dot image data received from the mail server device 50 with an electronic mail format is encrypted by software according to such an encrypting method as an MH, an MR and an MMR defined by facsimile communication standards, and then is transmitted to a facsimile device at a destination. According to necessity, the image memory 8 stores image data, and outputs stored image data.

As shown in FIG. 4, electronic mail for an image data transfer includes a header, encrypted text and an attached file. The header includes a destination (To), a copy transmission destination (CC), a subject and so on. The encrypted text includes a facsimile number of a transfer destination, and PIN information. The attached file includes image data, for example.

Figure 5:
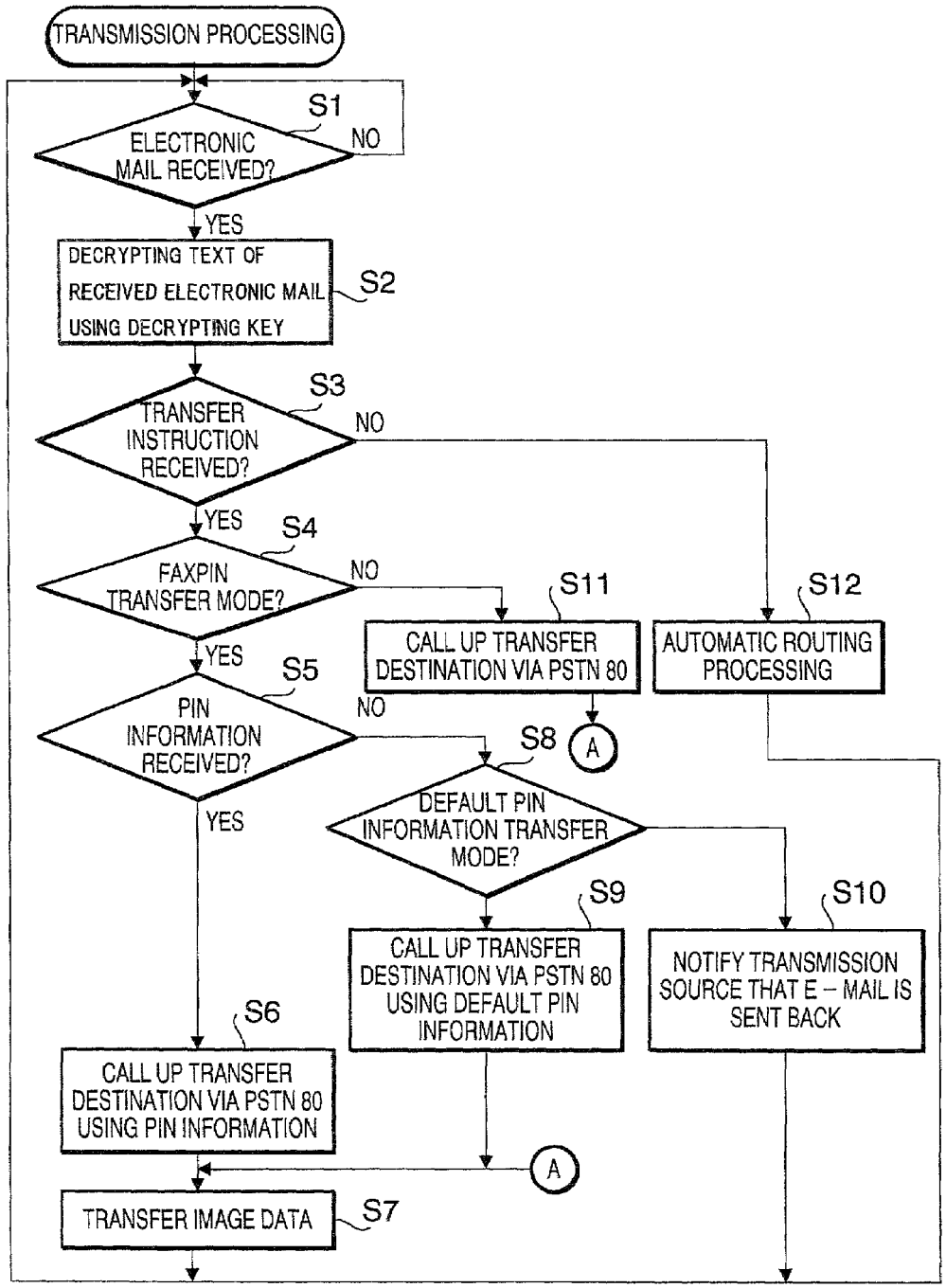
FIG. 5 is a flow chart showing transmission processing to be executed by the facsimile server device 20 in FIG. 3.

In FIG. 5, first, it is judged whether electronic mail has been received from the mail server device 50 in Step S1. The processing in Step S1 is repeated until electronic mail is received, and the processing proceeds to Step S2 when electronic mail is received (YES in Step S1). In Step S2, the text of the received electronic mail is decrypted by using the decrypting key which has been stored in the decrypting file 7a. In Step S3, on the basis of the decrypted text, it is judged whether there is a transfer instruction. If there is a transfer instruction with a facsimile number of a transfer destination (YES in Step S3), processing proceeds to Step S4. Meanwhile, if there is not a transfer instruction (NO in Step S3), processing proceeds to Step S12. In Step S12, automatic routing processing for transferring the received mail by a predetermined transmission method is executed, and then processing returns to Step S1. Next, in Step S4, it is judged whether the mode is a FAXPIN transfer mode in which facsimile image data is transmitted by requesting authentication with PIN information. If YES, processing proceeds to Step S5, and if NO, the transfer destination is called up via the PSTN 80 in Step S11, the image data is then transferred in Step S7, and processing returns to Step S1.

Then in Step S5, it is judged whether PIN information is in the text of the received electronic mail, and if YES, processing proceeds to Step S6, and if NO, processing proceeds to Step S8. In Step S6, the transfer destination is called up via the PSTN 80 by using the PIN information, the image data is then transferred in Step S7, and processing returns to Step S1. In Step 8, on the other hand, it is judged whether the mode is a default PIN information mode in which facsimile transmission is carried out by using default PIN information, and if YES, processing proceeds to Step S9, and if NO, processing proceeds to Step S10. In Step S9, the transfer destination is called up via the PSTN 80 by using predetermined default PIN information which has been stored in the default PIN information file 7b, the image data is then transferred in Step S7, and processing returns to Step S1. In Step S10, processing returns to Step S1 after an error notification to the effect that the electronic mail is sent back is performed to the transmission source with electronic mail.

As described hereinabove, according to the embodiment, the facsimile server device 20 receives, from the mail server device 50, electronic mail which includes at least a facsimile number of a transfer destination, PIN information which is an authentication number to the PSTN 80, and image data (YES in Step S1 in FIG. 5). The facsimile server device responds to the electronic mail, requests authentication to the PSTN 80 by using the PIN information, and transfers the data to the telephone number of the transfer destination when the authentication number is confirmed by (Steps S6 and S7). Therefore, even when the image data of the facsimile is transferred by using electronic mail, the authentication function of the switchboard can be used. Thus, it is possible to prevent illegal use of a public telephone line.

When the PIN information is not received (NO in Step S5) and the mode is not the default PIN information transfer mode (NO in Step S8), the facsimile server device 20 rejects the transmission of the data or the image data, and sends a reply to that effect to the transmission source with electronic mail (Step S10). Therefore, if the PIN information which is the authentication number is not provided, it is possible to prohibit a data transfer. Since electronic mail to the effect that a transfer has been rejected is sent back, a user of the client PC 30 at the transmission source can know the rejection.

When the PIN information is not received (NO in Step S5) and the mode is the default PIN information transfer mode (YES in Step S8), the facsimile server device 20 requests authentication to the PSTN 80 by using predetermined PIN information which has been stored in the default PIN information file in the RAM 7, and places a call (Step S9). Therefore, even if PIN information which is the authentication number is not provided, a transfer can be executed, and a user of the client PC 30 at the transmission source need not input PIN information every time transmission is carried out. Therefore, it is possible to improve performance in operation.

At least PIN information included in electronic mail which is transmitted from the client PC 30 is encrypted, and the facsimile server device 20 decrypts the text (including PIN information) of the received electronic mail by using the decrypting key which has been stored in the decrypting key file 7a in the RAM 7 (Step S2). Accordingly, it is possible to protect the secret of PIN information which is an authentication number and it is also possible to securely prevent the illegal use of the public telephone line L.

(Modification)

In the above embodiment, the facsimile server device 20 of the embodiment was described. The present invention, however, is not limited to the described and illustrated embodiment. For example, the present invention can be applied to communication terminal devices, including telephones, data communication devices and server devices, connected to such a public network as the PSTN and a public digital line network. Therefore, the above-mentioned image data may be various other data such as text data and program data. Moreover, a facsimile number of a transfer destination may be a telephone number of a public network line to which a data modem is connected.

As described hereinabove, the server device according to the embodiment of the present invention includes reception means for receiving electronic mail which has at least a telephone number of a transfer destination, an authentication number for a public network and data, and transmission means for responding to the received electronic mail, requesting authentication to the public network by using the authentication number, and transmitting the data to the telephone number of the transfer destination when the authentication number is confirmed. Therefore, even when data is transferred by using electronic mail, it is possible to use the authentication function of the switchboard. In this manner, it is possible to prevent illegal use of a public network line.

The server device according to another embodiment of the present invention includes reception means for receiving electronic mail which includes at least a facsimile number of a transfer destination, an authentication number for a public network and image data, and transmission means for responding to the received electronic mail, requesting authentication to the public network by using the authentication number, and transferring the image data to the facsimile number of the transfer destination when the authentication number is confirmed. Therefore, even when facsimile image data is transferred by using electronic mail, it is possible to use the authentication function of the switchboard. In this manner, it is possible to prevent illegal use of a public network line.

It is preferable that the server devices should further include replying means for rejecting the transmission of the data or the image data when the authentication number is not received, and sending a reply to that effect to the transmission source with electronic mail. Therefore, if an authentication number is not provided, it is possible to prohibit a transfer of data. Furthermore, since the electronic mail to the effect that the transfer has been rejected is sent back, a user at the transmission source can know the rejection.

In the server devices, when the authentication number is not received, it is preferable that the transmission means should request authentication to the public network by using a predetermined authentication number. Accordingly, it is possible to perform a transfer even if the authentication number is not provided. Since a user at a transmission source need not input authentication number every time transmission is carried out, it is possible to improve performance in operation.

In the server devices, it is preferable that at least the authentication number should be encrypted. Therefore it is possible to maintain confidentiality of an authentication number, and it is also possible to firmly prevent illegal use of the public network line.

What is claimed is:

1. A server device comprising:
   receiving means for receiving, from a channel, electronic mail including information of a transfer destination, an authentication number to an authentication device and data; and
   transfer means for responding to the electronic mail, requesting authentication to the authentication device and transferring the data to the transfer destination when the authentication number is confirmed by the authentication device,
   wherein the authentication device is a switchboard of a public switched telephone network (PSTN), and
   wherein the authentication number is a personal identification number (PIN).

2. The server device according to claim 1, further including reply means for rejecting the transfer of the data when the authentication number is not received by the server device, sending a reply to that effect to the transmission source of the data by using electronic mail.

3. The server device according to claim 1, wherein the transfer means requests authentication to the authentication device by using a predetermined authentication number when the authentication number is not received by the server device.

4. The server device according to claim 1, wherein the authentication number is encrypted.

5. The server device according to claim 1, wherein the information of the transfer destination is a telephone number or a facsimile number.

6. The server device according to claim 1, wherein the data is character data, image data, or program data.

7. A communication method, comprising the steps of:
   receiving electronic mail which includes information of a transfer destination, an authentication number to an authentication device, and data; and
   responding to the received electronic mail, requesting authentication to the authentication device by using the authentication number, and transferring the data to the transfer destination after the authentication number is confirmed by the authentication device,
   wherein the authentication device is a switchboard of a public switched telephone network (PSTN), and
   wherein the authentication number is a personal identification number (PIN).

8. The communication method according to claim 7, further including the step of requesting authentication to the authentication device by using a predetermined authentication number when the authentication number is not received by the server device.

9. The communication method according to claim 7, further including the step of rejecting the transfer of the data when the authentication number is not received, and sending a reply to that effect to the transmission source of the data.

10. The communication method according to claim 7, further including the step of decrypting the encrypted authentication number when the authentication number is encrypted.

11. The communication method according to claim 7, wherein the information of the transfer destination is a telephone number or a facsimile number.

12. The communication method according to claim 7, wherein the data is character data, image data, or program data.

13. A recording medium recording a program to be executed by a computer, comprising:
    first program code means for receiving electronic mail which includes information of a transfer destination, an authentication number to an authentication device and data; and
    second program code means for responding to the received electronic mail, requesting authentication to the authentication device by using the authentication number, and transferring the data to the transfer destination when the authentication number is confirmed by the authentication device,
    wherein the authentication device is a switchboard of a public switched telephone network (PSTN), and
    wherein the authentication number is a personal identification number (PIN).

14. The recording medium according to claim 13, wherein the information of the transfer destination is a telephone number or a facsimile number.

15. The recording medium according to claim 13, wherein the data is character data, image data, or program data.

* * * * *